US005922065A

United States Patent [19]
Hull et al.

[11] Patent Number: 5,922,065
[45] Date of Patent: Jul. 13, 1999

[54] PROCESSOR UTILIZING A TEMPLATE FIELD FOR ENCODING INSTRUCTION SEQUENCES IN A WIDE-WORD FORMAT

[75] Inventors: James M. Hull, Cupertino; Kent Fielden, Sunnyvale; Hans Mulden, San Francisco; Harshvardhan Sharangpani, Santa Clara, all of Calif.

[73] Assignee: Institute For The Development Of Emerging Architectures, L.L.C., Cupertino, Calif.

[21] Appl. No.: 08/949,279

[22] Filed: Oct. 13, 1997

[51] Int. Cl.⁶ .......................................................... G06F 9/38
[52] U.S. Cl. ............................ 712/24; 712/203; 712/209
[58] Field of Search .............................. 395/800.24, 379, 395/386, 385, 391; 712/24, 203, 210, 209, 215

[56] References Cited

U.S. PATENT DOCUMENTS 4,833,599  5/1989  Colwell et al. .
5,057,837  10/1991  Colwell et al. ............................ 341/55
5,600,810  2/1997  Ohkami .................................... 395/567
5,669,001  9/1997  Moreno ..................................... 395/706
5,761,470  6/1998  Yoshida .................................... 395/384
5,819,058  10/1998  Miller et al. ............................. 395/386
5,826,054  10/1998  Jacobs et al. ............................ 395/389

*Primary Examiner*—Richard L. Ellis
*Attorney, Agent, or Firm*—Blakely, Sokoloff, Taylor & Zafman, LLP

[57] ABSTRACT

A processor having a large register file utilizes a template field for encoding a set of most useful instruction sequences in a long instruction word format. The instruction set of the processor includes instructions which are one of the plurality of different instruction types. The execution units of the processor are similarly categorized into different types, wherein each instruction type may be executed on one or more of the execution unit types. The instructions are grouped together into 128-bit sized and aligned containers called bundles, with each bundle includes a plurality of instruction slots and a template field that specifies the mapping of the instruction slots to the execution unit types.

31 Claims, 3 Drawing Sheets

| INSTRUCTION SLOT 2 | INSTRUCTION SLOT1 | INSTRUCTION SLOT 0 | TEMPLATE | S |
|---|---|---|---|---|
| 127 | 87  86 | 46  45 | 5  4 | 1  0 |

| TEMPLATE | SLOT 0 | SLOT 1 | SLOT 2 |
|---|---|---|---|
| 0 | M-UNIT | I-UNIT | I-UNIT |
| 1 | M-UNIT | I-UNIT | I-UNIT |
| 2 | M-UNIT | L-UNIT | I-UNIT |
| 3 | | | |
| 4 | M-UNIT | M-UNIT | I-UNIT |
| 5 | M-UNIT | M-UNIT | I-UNIT |
| 6 | M-UNIT | F-UNIT | I-UNIT |
| 7 | M-UNIT | M-UNIT | F-UNIT |
| 8 | M-UNIT | I-UNIT | B-UNIT |
| 9 | M-UNIT | B-UNIT | B-UNIT |
| A | | | |
| B | B-UNIT | B-UNIT | B-UNIT |
| C | M-UNIT | M-UNIT | B-UNIT |
| D | | | |
| E | M-UNIT | F-UNIT | B-UNIT |
| F | | | |

| INSTRUCTION TYPE | DESCRIPTION | EXECUTION UNIT TYPE |
| --- | --- | --- |
| A | INTEGER ALU | I-UNIT OR M-UNIT |
| I | NON-ALU INTEGER | I-UNIT |
| M | MEMORY | M-UNIT |
| F | FLOATING POINT | F-UNIT |
| B | BRANCH | B-UNIT |
| L | LONG IMMEADIATE | I-UNIT |

*FIG. 2*

| INSTRUCTION SLOT 2 | INSTRUCTION SLOT1 | INSTRUCTION SLOT 0 | TEMPLATE | S |
| --- | --- | --- | --- | --- |
| 127    87 | 86    46 | 45    5 | 4    1 | 0 |

*FIG. 3*

| TEMPLATE | SLOT 0 | SLOT 1 | SLOT 2 |
| --- | --- | --- | --- |
| 0 | M-UNIT | I-UNIT | I-UNIT |
| 1 | M-UNIT | I-UNIT | I-UNIT |
| 2 | M-UNIT | L-UNIT | I-UNIT |
| 3 | | | |
| 4 | M-UNIT | M-UNIT | I-UNIT |
| 5 | M-UNIT | M-UNIT | I-UNIT |
| 6 | M-UNIT | F-UNIT | I-UNIT |
| 7 | M-UNIT | M-UNIT | F-UNIT |
| 8 | M-UNIT | I-UNIT | B-UNIT |
| 9 | M-UNIT | B-UNIT | B-UNIT |
| A | | | |
| B | B-UNIT | B-UNIT | B-UNIT |
| C | M-UNIT | M-UNIT | B-UNIT |
| D | | | |
| E | M-UNIT | F-UNIT | B-UNIT |
| F | | | |

*FIG. 4*

PROCESSOR UTILIZING A TEMPLATE FIELD FOR ENCODING INSTRUCTION SEQUENCES IN A WIDE-WORD FORMAT

FIELD OF THE INVENTION

The present invention relates generally to the field of processor architecture. More specifically, to an instruction encoding method and apparatus for increasing the efficiency of processor operation.

BACKGROUND OF THE INVENTION

In the field of high speed computer processors, there have been a variety of approaches to the problem of how best to encode instructions. Early on, processors manufactured by Intel® Corporation utilized variable length encoding in which different instruction were encoded with different bit lengths. While this approach gained wide acceptance in the computer industry, the Intel architecture (iA) encoding method was improved on by reduced instruction set computing (RISC) machines.

In a RISC machine, all fields are uniformly encoded, with every instruction having a fixed length (e.g., 32-bits). The fixed, 32-bit length of the instruction fields provide enough bit positions, or "space", to encode instructions that use three operands, with every operand containing a 5-bit register identification. Therefore, the RISC approach provides adequate space to encode opcode bits, immediate values, offsets, etc.

More recently, there has developed a demand in the computer industry for highly efficient, parallel processing machines having the ability to process a large plurality of instructions in a single machine cycle. These machines, commonly referred to as very long instruction word (VLIW) or wide-word computer processors, are capable of processing several instructions at a time. By way of example, a VLIW multiprocessor capable of handling 1,024-bits of instruction each clock cycle is described in U.S. Pat. No. 4,833,599.

One of the problems that arises in a VLIW or wide-word machine is how to encode instructions which address large register files, i.e., 128 registers. One approach, adopted by Hewlett-Packard®, Co., in their original wide-word designs was to group instructions in a single 128-bit entry that contained three 42-bit instructions (with 2 bits leftover). Each of the three instructions of the 128-bit entry was restricted to be of a certain type. That is, the first instruction is restricted to being a memory type instruction, the second instruction had to be an integer type, and the third instruction was limited to being a floating-point type of instruction.

The fundamental problem with this wide-word, fixed, 128-bit format is that it greatly expands the code and introduces inefficiencies in the packing of instruction bytes. For example, a LOAD instruction may only be 1 or 2 bytes long, but in prior art wide-word format, 42-bits would necessarily still be supplied. Even greater inefficiencies arise in sequences of instructions where only 1 or 2 of the instructions in each of the successive 128-bit instruction entries are utilized.

Persons familiar with superscalar processors will further appreciate that RISC machines also suffer difficulties when trying to simultaneously process a large number of instructions. For example, a RISC processor designed to execute many instructions in parallel requires an large number of multiplexers and associated wiring to route the various instructions to the appropriate functional units. This places practical limitations on the number of instructions which can be processed in parallel.

Thus, there is a need for a processor that reduces the waste and inefficiency associated with past instruction encoding methods and apparatus. As will be seen, the present invention provides a processor capable of simultaneously executing a plurality of sequential instructions with a highly-efficient encoding of instructions.

SUMMARY OF THE INVENTION

A processor is described which utilizes a template field for encoding a set of most useful instruction sequences in a long instruction word format. In one embodiment, the invented processor comprises a register file having 128 registers. The instruction set of the processor includes instructions which address the 128 registers, with each instruction being one of the plurality of different instruction types. The execution units of the processor are similarly categorized into different types, wherein each instruction type may be executed on one or more of the execution unit types.

According to the present invention, instructions are grouped together into 128-bit sized and aligned containers called bundles. Each bundle includes first, second, and third instruction slots, and a template field that specifies the mapping of the instruction slots to the execution unit types. The improved instruction encoding scheme utilized in the present invention provides enhanced flexibility and greater efficiencies as compared to prior art approaches.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 2 shows the relationship between instruction types and execution unit types for one embodiment of the present invention.

FIG. 3 is a diagram illustrating a bundle format for instruction encoding according to one embodiment of the present invention.

FIG. 4 shows a template field encoding an instruction slot mapping for one embodiment of the present invention.

DETAILED DESCRIPTION

Figure 1:
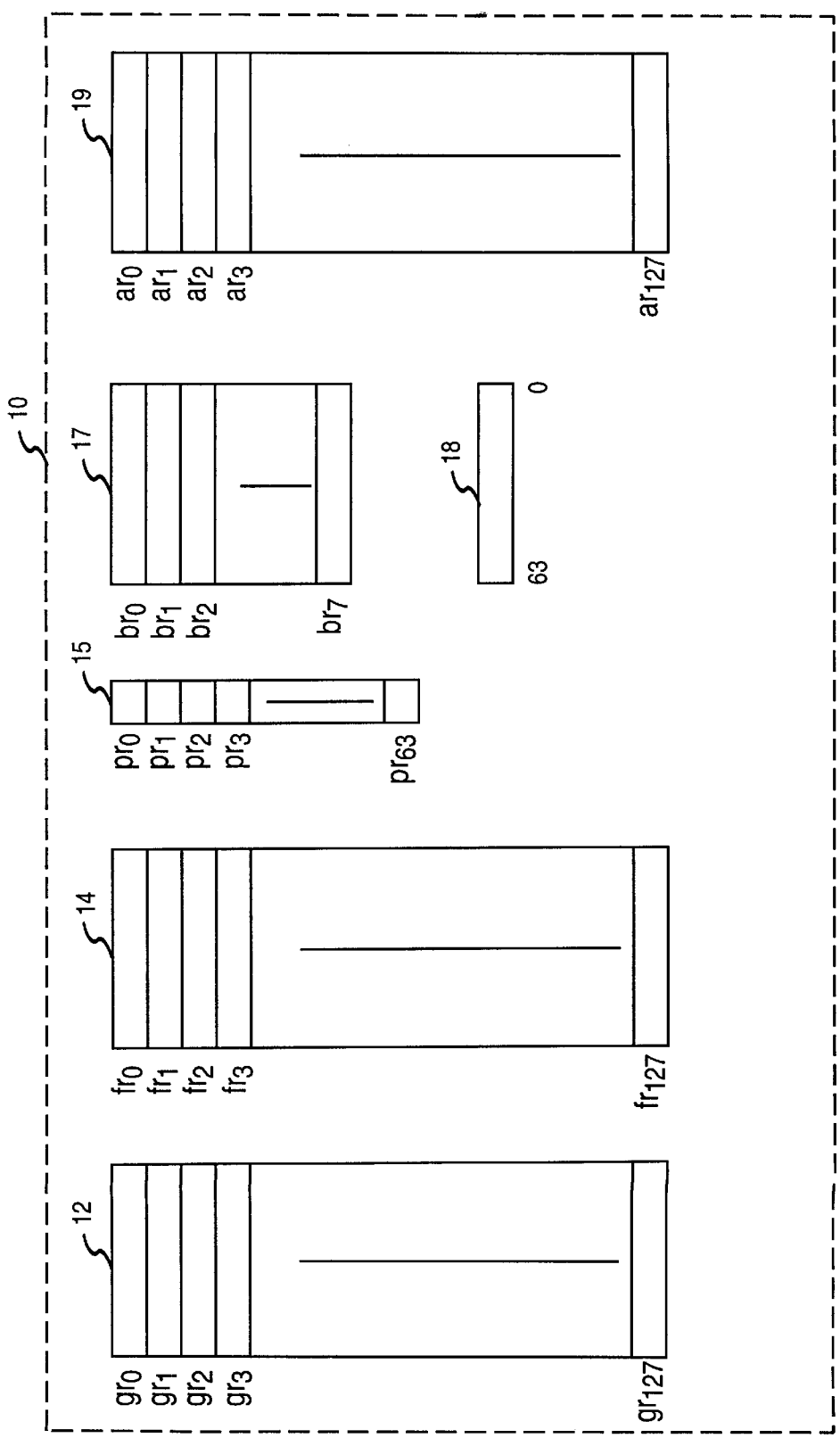
FIG. 1 illustrates an architectural register model in accordance with one embodiment of the processor of the present invention.

The present invention covers a processor with instruction encoding that utilizes a template field. In the following description, numerous specific details are set forth, such as register file models, bit lengths, specific encodings, etc., in order to provide a thorough understanding of the present invention. Practitioners having ordinary skill in the data processing arts will understand that the invention may be practiced without many of these details. In other instances, well-known signals, components, and circuits have not been described in detail to avoid obscuring the invention.

FIG. 1 illustrates the architectural register model employed in one embodiment of the processor of the present invention. Persons of ordinary skill in the field of processor design understand that the architectural state of a processor consists of the contents of the processor's registers and memory. The results of instruction execution become architecturally visible according to a set of rules embodied within the processor governing execution sequencing. As shown, architectural register model 10 includes a general purpose register file 12 that provides a central resource for all integer and multimedia computations. The general registers are a set of 128 (64-bit) registers that are numbered $gr_0$ through $gr_{127}$, and are available to all programs and all privileged levels.

Application register model 10 also includes a floating-point register set 14 that is used for all floating-point computations. The floating-point registers are numbered $fr_0$ through $fr_{127}$, and similarly comprise a set of 128 (82-bit) registers in one implementation of the processor of the present invention. Also shown in FIG. 1 are predicate registers 15, numbered $pr_0$ through $pr_{63}$. Predicate registers 15 comprise single-bit registers used in predication and branching. They are used to hold the results of compare instructions, and are typically used for conditional execution of instructions.

Branch register file 17 is used to hold branching information. For example, branch registers $br_0$ through $br_7$ comprise 64-bit registers that may be used to specify the branch target addresses for indirect branches.

Also shown in FIG. 1 is an instruction pointer 18 that holds the address of the "bundle" which contains the currently executing instruction. As will be described in more detail shortly, the term "bundle" refers to three instructions and a template field grouped together into a 128-bit sized field.

Finally, register model 10 further includes an application register file 19 comprising special data registers and control registers for application visible processor functions. Typically, these registers are accessed by application software. It is appreciated that the register model shown in FIG. 1 may include other register types implementing various processor features. The list of registers available within the processor of the present invention is not deemed essential to an understanding of the novel concepts described herein.

With reference now to FIG. 2, there is shown a table 20 that lists the instruction types and the execution unit types for executing instructions in one embodiment of the present invention. Each instruction is categorized into one of six different types. The six different instruction types include integer arithmetic logic unit (ALU) instructions, non-ALU integer instructions, memory instructions, floating-point instructions, branch instructions, and long immediate instructions. The instruction unit type on which each of these different instruction types may be executed is shown in the right-most column of table 20. These different execution unit types include the integer execution unit (I-unit), the memory execution unit (M-unit), the floating-point execution unit (F-unit), and the branch execution unit (B-unit).

FIG. 3 shows how instruction are encoded in the processor of the present invention. FIG. 3 illustrates a 128-bit (16-byte aligned) bundle 30 that contains three 41-bit instruction slots, a 4-bit template field, and a stop bit (S-bit). The format of bundle 30 depicted in FIG. 3 shows the stop-bit occupying bit position 0, the template filed occupying bit positions 1–4, and instruction slots 0, 1, and 2 occupying bit positions 5–45, 46–86, and 87–127, respectively.

According to the instruction format shown in FIG. 3, all instructions in the instruction set of the processor are 41 bits in length. The 4-bit template field permits the encoding of multiple sequences of instruction of different instruction types. In other words, the template field specifies the mapping of instruction slots to execution unit types. The template field also specifies instruction group boundaries within a bundle. An instruction group is a set of statically contiguous instructions that may be executed concurrently. For example, an instruction group has no read-after-write or write-after-write register dependencies between them. An instruction group contains at least one instruction, and there are no architectural limits to the maximum number of instructions. Practitioners in the art will therefore appreciate that instruction group boundaries have no fixed relationship to bundle boundaries; they are simply indicated statically by the template field and the S-bit.

The S-bit specifies whether an instruction group boundary occurs after the last instruction (i.e., slot 2) of the current bundle. For instance, in a current implementation, if the S-bit is set to "0" the current instruction group continues into the first instruction (i.e., slot 0) of the statically next sequential bundle. That is, there is no instruction group boundary after the last instruction in the bundle. Conversely, setting the S-bit to "1" means that an instruction group boundary occurs after the last instruction in the bundle.

Referring now to FIG. 4, there is shown the template field encoding and instruction slot mapping for one embodiment of the processor of the present invention. As described above, the template field specifies two properties: instruction group boundaries within a bundle, and the mapping of instruction slots to execution unit types. It is important to note that not all combinations of these two properties are permitted. The combinations which are defined in the current embodiment are illustrated in table 40 of FIG. 4. Practitioners familiar with the computer arts will appreciate that table 40 provides instruction encoding for the most useful instruction sequences typically encountered in modern computer programs.

The three right-most columns of table 40 correspond to the three instruction slots within a bundle. Listed within each column of the three right-most columns is the execution unit type which is controlled by that instruction slot. For example, template 6 specifies that the instruction in slot 0 is executed by the memory execution unit, the instruction in slot 1 is executed by the floating-point execution unit, and the instruction unit in slot 2 is executed by the integer execution unit of the processor.

Note that table 40 includes double lines 42 and 43 separating two instruction slots associated with template 1 and template 5, respectively. Double line 42 separates slot 1 and slot 2 for template 1, whereas double line 43 separates slot 0 and slot 1 in template 5. These double lines indicate that an instruction group boundary occurs at that point. Basically, the double lines function as a stop-bit between the two adjacent instructions. This means, for example, that in the case of template 5, the slot 0 instruction is allowed to depend on the slot 1 instruction. By encoding the template field to define stop points between two instructions within a bundle, the compiler is allowed to indicate to the hardware where dependencies reside within the code. Persons of skill in the field of computer architecture will appreciate that the ability to specify intra-bundle instruction group boundaries (via template fields 1 and 5)—in addition to defining inter-bundle instruction group boundaries (via the S-bit)—is an extremely valuable processor function.

Within a bundle, execution order proceeds from slot 0 to slot 2. If the S-bit is 0, the instruction group containing the last instruction (slot 2) of the current bundle continues into the first instruction (slot 0) of the statically next sequential bundle. On the other hand, if the S-bit is 1 an instruction group boundary occurs after the last instruction of the current bundle. It is appreciated that the use of the stop-bit is a great advantage in executing a code that is highly sequential. For example, a sequential code that includes a LOAD followed by an ADD followed by a STORE operation can simply be sequenced by use of the S-bit after the three operations. In the past, a full 128-bit entry would have to be used for each instruction in the sequence, even though the actual encoding of the instruction may occupy only 1 or 2 bytes.

It should be further understood that a program according to the present invention, consists of a sequence of instructions, packed in bundles, and organized into instruction groups that are statically delimited by S-bits, with templates specifying S-bits within a bundle. The instruction groups and the instructions within them are ordered as follows. Bundles are ordered from lowest to highest memory address. Instructions in bundles with lower memory addresses are considered to precede instructions in bundles with higher memory addresses.

The byte order of bundles in memory is little-endian. This means that the template field and the S-bit are contained in byte 0 of the bundle. Within a bundle, instructions and instruction groups are ordered from instruction slot 0 to instruction slot 2 as shown in FIG. 3.

An ordinary compiler may used in conjunction with the processor of the present invention. Obviously, however, it should be adapted to take advantage of the instruction encoding scheme described above. Generally speaking, the compiler should be designed to use of the template fields to provide the most compact code possible.

Practitioners in the art will understand that the unused template values appearing in table 40 of FIG. 4 are reserved in the illustrated embodiment. These unused template values appear as empty rows associated with template 3, A, D and F. The empty templates are available for use in future extensions of the processor architecture. Specifying one of these unused template values in the processor causes an illegal operation fault.

It should also be noted that for template 2, the L-unit designation in the column of slot 1 represents a placeholder for a long immediate instruction type. In addition, the I-unit designation in the column of slot 2 of template 2 is restricted in that only movl, break and nop operations may be encoded in this particular slot for one embodiment of the present invention. Encoding other instructions in this slot causes an illegal operation fault. A further restriction is that encoding a movl instruction in an I-unit slot other than the one in template 2 causes an illegal operation fault in the described embodiment.

We claim:

1. A processor comprising:
   a register file having a plurality of registers;
   an instruction set including instructions which address the registers, each instruction being one of a plurality of instruction types;
   a plurality of execution units, each execution unit being one of a plurality of types, wherein each instruction type is executed on one or more execution unit types;
   and further wherein the instructions are encoded in bundles, each bundle including a plurality of instructions and a template field grouped together in a N-bit field, the instructions being located in instruction slots of the N-bit field, the template field specifying a mapping of the instruction slots to the execution unit types.

2. The processor of claim 1 wherein the template field further specifies instruction group boundaries within the bundle, with an instruction group comprising a set of statically contiguous instructions that are executed concurrently.

3. The processor of claim 2 wherein the instruction types include integer arithmetic logic unit, memory, floating-point, and branch instructions.

4. The processor of claim 3 wherein the instruction types further include non-arithmetic logic unit integer, and long immediate instructions.

5. The processor of claim 4 wherein the execution unit types include integer, memory, floating-point, and branch execution units.

6. The processor of claim 5 wherein the template field comprises a 4-bit field.

7. The processor of either claim 1, 2, 3, 4, 5 or 6 wherein the bundles comprise first, second, and third instruction slots, with each bundle being 128-bits in length.

8. The processor of claim 7 wherein each of the first, second, and third instruction slots are 41-bits long.

9. The processor of claim 7 wherein the bundle further includes a stop-bit that specifies an inter-bundle instruction group boundary.

10. The processor of claim 9 wherein, if the stop-bit is in a first condition, the instruction group boundary occurs after a last instruction of a current bundle.

11. The processor of claim 10 wherein, if the stop-bit is in a second condition, an instruction group containing the last instruction of the current bundle continues into the first instruction slot associated with a statically next sequential bundle.

12. The processor of claim 11 wherein the last instruction of the current bundle comprises the third instruction slot.

13. The processor according to claim 9 further comprising a memory that stores the bundles, a byte order of the bundles in the memory being in a little-endian format, with the template field and the stop-bit being contained in a first byte of the bundle.

14. The processor of claim 13 wherein the bundles are ordered in the memory from a lowest to a highest memory address.

15. The processor of claim 14 wherein an instruction in the bundles with the lowest memory address precedes an instruction in the bundles with the highest memory address.

16. The processor of claim 1 wherein the plurality of registers comprise 128 registers.

17. A processor comprising:
    a register file having a plurality of registers;
    an instruction set including instructions which address the registers, each instruction being one of a plurality of instruction types;
    a plurality of execution units, each execution unit being one of a plurality of types, wherein each instruction type is executed on one or more execution unit types;
    and further wherein the instructions are encoded in bundles, each bundle including a plurality of instructions and a template field grouped together in a N-bit field, the instructions being located in instruction slots of the N-bit field, the template field specifying a mapping of the instruction slots to the execution unit types, at least one encoding of the template field further specifying instruction group boundaries within a bundle, with an instruction group comprising a set of statically contiguous instructions that are executed concurrently.

18. The processor of claim 17 wherein the bundles comprise first, second, and third instruction slots, with each bundle being 128-bits in length.

19. The processor of claim 17 wherein the instruction types include integer arithmetic logic unit, memory, floating-point, and branch instructions.

20. The processor of claim 19 wherein the instruction types further include non-arithmetic logic unit integer, and long immediate instructions.

21. The processor of claim 20 wherein the execution unit types include integer, memory, floating-point, and branch execution units.

22. The processor of claim 17 wherein each bundle further includes a stop-bit that specifies an inter-bundle instruction group boundary.

23. The processor of claim 22 wherein, if the stop-bit is in a first condition, the instruction group boundary occurs after a last instruction of a current bundle.

24. The processor of claim 23 wherein, if the stop-bit is in a second condition, an instruction group containing the last instruction of the current bundle continues into the first instruction slot associated with a statically next sequential bundle.

25. The processor of claim 24 wherein the last instruction of the current bundle comprises the third instruction slot.

26. The processor according to claim 22 further comprising a memory that stores the bundles, a byte order of the bundles in the memory being in a little-endian format, with the template field and the stop-bit being contained in a first byte of the bundle.

27. The processor of claim 26 wherein the bundles are ordered in the memory from a lowest to a highest memory address.

28. The processor of claim 27 wherein an instruction in the bundles with the lowest memory address precedes an instruction in the bundles with the highest memory address.

29. The processor of claim 17 wherein the plurality of registers comprise 128 registers.

30. A processor comprising:

a register file having a plurality of registers;

an instruction set including instructions which address the registers, each instruction being one of a plurality of instruction types;

a plurality of execution units, each execution unit being one of a plurality of types, wherein each instruction type is executed on one or more execution unit types;

and further wherein the instructions are encoded in bundles, each bundle including a plurality of instructions, a stop bit, and a template field grouped together in a N-bit field, the instructions being located in instruction slots of the N-bit field, the template field specifying a mapping of the instruction slots to the execution unit types, at least one encoding of the template field further specifying instruction group boundaries within a bundle, with an instruction group comprising a set of statically contiguous instructions that are executed concurrently, the stop bit specifying an inter-bundle instruction group boundary.

31. A processor comprising:

a register file having a plurality of registers;

an instruction set including instructions which address the registers, each instruction being one of a plurality of instruction types;

a plurality of execution units, each execution unit being one of a plurality of types, wherein each instruction type is executed on one or more execution unit types;

and further wherein the instructions are encoded in bundles, each bundle including a plurality of instructions and a template field grouped together in a N-bit field, the instructions being located in instruction slots of the N-bit field, the template field specifying a mapping of the instruction slots to the execution unit types, an unused encoding of the template field being available for use in a future extension of the processor.

* * * * *